(12) United States Patent
Mathur et al.

(10) Patent No.: US 10,613,878 B2
(45) Date of Patent: Apr. 7, 2020

(54) PLUG-INS AS MICROSERVICES

(71) Applicant: Avid Technology, Inc., Burlington, MA (US)

(72) Inventors: Shailendra Mathur, Beaconsfield (CA); Timir K. Sinha, Verdun (CA)

(73) Assignee: AVID TECHNOLOGY, INC., Burlington, MA (US)

( * ) Notice: Subject to any disclaimer, the term of this patent is extended or adjusted under 35 U.S.C. 154(b) by 0 days.

(21) Appl. No.: 16/269,898

(22) Filed: Feb. 7, 2019

(65) Prior Publication Data

US 2019/0265986 A1 Aug. 29, 2019

Related U.S. Application Data

(60) Provisional application No. 62/635,680, filed on Feb. 27, 2018.

(51) Int. Cl.
*G06F 3/00* (2006.01)
*G06F 9/445* (2018.01)
*G06F 13/38* (2006.01)
*G06F 9/54* (2006.01)
*G06F 8/30* (2018.01)

(52) U.S. Cl.
CPC ............ *G06F 9/44526* (2013.01); *G06F 8/31* (2013.01); *G06F 9/546* (2013.01); *G06F 13/38* (2013.01); *G06F 2213/40* (2013.01)

(58) Field of Classification Search
CPC ........................................................ G06F 9/54
USPC ........................................................ 719/310
See application file for complete search history.

(56) References Cited

U.S. PATENT DOCUMENTS

| 2003/0041179 A1* | 2/2003 | Snead ..................... G06F 9/542 719/321 |
| 2005/0278418 A1* | 12/2005 | Rathakrishnan ........ G06F 9/542 709/203 |
| 2007/0234347 A1 | 10/2007 | Grecco et al. |

(Continued)

OTHER PUBLICATIONS

Nicholas Jillings, Intelligent audio plugin framework for the Web Audio API (Year: 2017).*

(Continued)

*Primary Examiner* — Lechi Truong
(74) *Attorney, Agent, or Firm* — Oliver Strimpel (57) ABSTRACT

Plug-in software modules for a media processing application are deployed in a service-oriented architecture as microservices within a Web-scale environment. Each plug-in module registered within a distributed service hosting environment runs as an instance within a gasket that mediates the interaction of the plug-in instance with the environment. The gaskets convert media essence that is input to or output from the plug-in instances from media files to buffers and vice versa as required. Media essence representing intermediate results may be streamed as media essence channels on a data bus, enabling microservice-based processing to be applied in a live environment. Gaskets subscribe to specific media essence channels on the data bus, and output processed media to a media essence channel corresponding to the function of the plug-in module. The use of plug-in associated media channels on a data bus supports decoupled media processing by the plug-in modules.

20 Claims, 5 Drawing Sheets

(56) References Cited

U.S. PATENT DOCUMENTS

2011/0154290 A1    6/2011  Kelly

OTHER PUBLICATIONS

AAX SDK Manual, Doxygen 1.8.9.1, Chapter 12, pp. 43-356, Feb. 2, 2018.
AMA SDK Developer's Guide 3.1, Avid Technology, Inc., Chapters 1-3, pp. 1-10, Apr. 29, 2013.
AVX Connectivity Toolkit, AVX Developer Program, Avid Technology, Inc., Avid website: www.avid.com/alliance-partner-program/avx-connectivity-toolkit, 3 pages, printout Apr. 9, 2019.
Microservices, A Definition of this New Architectural Term, James Lewis, et al., pp. 1-16, Mar. 25, 2014.

* cited by examiner

PLUG-INS AS MICROSERVICES

CROSS REFERENCE TO RELATED APPLICATION

This application claims right of priority to and the benefit under 35 U.S.C. § 119(e) of U.S. provisional patent application Ser. No. 62/635,630, filed Feb. 27, 2018.

BACKGROUND

The functionality of desktop software applications is often supplemented through the use of plug-in software modules. These modules, often provided by third parties, interact with the application through one of several standard application program interfaces (APIs), and are usually hosted on the same platform that hosts the application. However, software is increasingly being developed for and deployed within a web-based services-oriented framework. There is therefore a need adapt the use of plug-ins so that they can be deployed within a distributed Web-based environment.

SUMMARY

In general, the methods, systems, and computer program products described herein provide an architecture, adapters, and a data bus to enable third party plug-ins to be shared between desktop applications in a service-oriented architecture as microservices within a distributed Web-scale environment.

In general, in one aspect, a method of using a first plug-in software module with a media processing application to process a media file in a distributed service hosting environment, wherein the first plug-in software module is a copy of an original version of the first software plug-in module designed to be hosted within the media processing application, comprises: in response to receiving a first message: using a first plug-in host running within a first gasket within a service hosting framework to read a description of the first plug-in software module and to generate an instance of the first plug-in software module running within the first gasket; inputting media essence obtained directly or indirectly from the media file to the instance of the first plug-in software module via the first gasket, wherein the first gasket presents data to the first plug-in instance in a format determined by input requirements for the first plug-in instance; processing the media essence with the instance of the first plug-in software module; via the first gasket, outputting the processed media essence from the instance of the first plug-in software module; and using the first gasket to issue a second message indicating that processed media essence is available.

Various embodiments include one or more of the following features. The first gasket converts the processed media essence output from the instance of the first plug-in software module into a stream for streaming as a media essence channel on a data bus; the gasket associates a first channel identity with the media essence channel; and the second message indicates that the media essence channel stream is available on the data bus. The first gasket subscribes to a channel on the data bus associated with a second channel identity, and inputting media essence from the media file to the instance of the first plug-in software module comprises reading a media essence stream from the channel on the data bus associated with the second channel identity. The first gasket outputs the processed media essence from the instance of the first plug-in software module as a processed media file that is written onto shared storage. The first message is received, and the second message is issued over a messaging system. The media essence from the media file includes video and processing of the media essence with the instance of the first plug-in software module comprises applying a first video effect to the media essence. The media essence from the media file includes audio and processing of the media essence with the instance of the first plug-in software module comprises applying a first audio effect to the media essence. The media essence from the media file includes graphics and processing of the media essence with the instance of the first plug-in software module comprises applying a first graphics effect to the media essence. The media essence from the media file includes ancillary data, and processing of the media essence with the instance of the first plug-in software module comprises processing the ancillary data. The received message was sent by the media processing application. The received message was sent by a second gasket within the service hosting framework when an instance of a second plug-in running within the second gasket outputted media essence processed by the instance of the second plug-in. Processing of the media essence with the instance of the first plug-in comprises applying a first effect to the media essence output by the instance of the second plug-in and processing of the media essence with the instance of the second plug-in comprises applying a second effect to media essence input to the instance of the second plug-in. Applying a first effect to the media essence output by the instance of the second plug-in comprises performing video color-correction or a video blur to the media essence output by the instance of the second plug-in. The format required by the input requirements for the first plug-in instance comprises one of a file and a buffer. The first plug-in software module is one of a media file reader and a media file writer. Inputting media essence obtained from a second media file to the instance of the first plug-in software module via the first gasket, wherein processing the media essence with the instance of the first plug-in module includes processing media essence obtained from the second media file. The instance of the first plug-in module applies a video compositing effect. The instance of the first plug-in module receives a parameter value via the first gasket and an aspect of the processing of the media essence with the instance of the first plug-in is controlled by the parameter value.

In general, in another aspect, a computer program product comprises: a non-transitory computer-readable medium with computer program instructions encoded thereon, wherein the computer program instructions, when processed by a computer system instruct the computer system to perform a method of using a first plug-in software module with a media processing application to process a media file in a distributed service hosting environment, wherein the first plug-in software module is a copy of an original version of the first software plug-in module designed to be hosted within the media processing application, the method comprising: in response to receiving a first message: using a first plug-in host running within a first gasket within a service hosting framework to read a description of the first plug-in software module and to generate an instance of the first plug-in software module running within the first gasket; inputting media essence obtained directly or indirectly from the media file to the instance of the first plug-in software module via the first gasket, wherein the first gasket presents data to the first plug-in instance in a format determined by input requirements for the first plug-in instance; processing the media essence with the instance of the first plug-in software module; via the first gasket, outputting the processed media essence from the instance of the first plug-in software module; and using the first gasket to issue a second message indicating that processed media essence is available.

DETAILED DESCRIPTION

Figure 1:
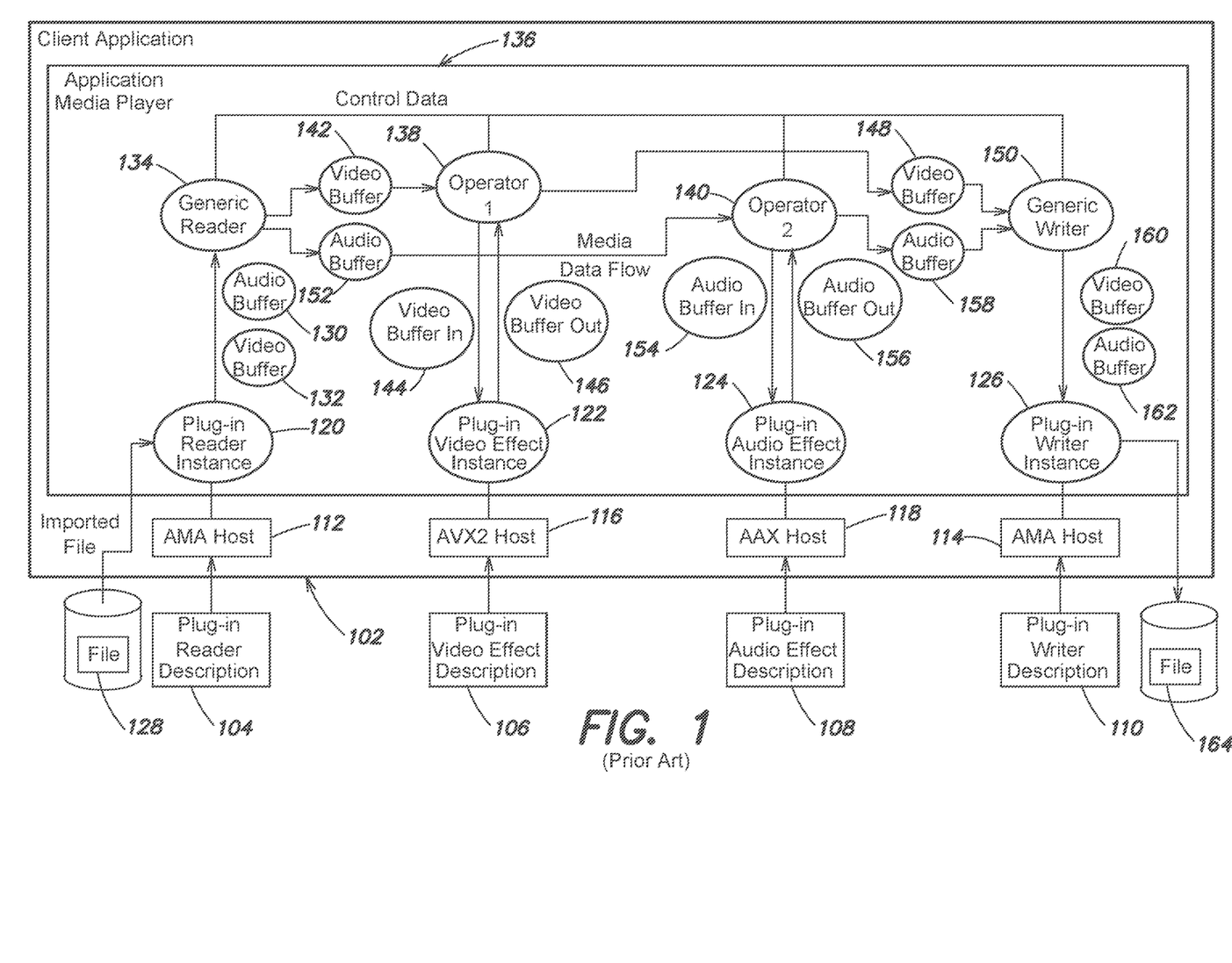
FIG. 1 is a high-level block diagram illustrating the prior art deployment of third party plug-ins as software modules hosted locally or on shared storage, that interface with a desktop client application via standard APIs.

Third party plug-ins provide a convenient way of supplementing the functionality of a desktop application. These plug-ins interface with the desktop application via one of several standard APIs. Users of media processing applications, for example, often use such plug-ins to provide specialized media processing functions. In the case of a video editing system, such functions may provide the media processing application with the ability to read and write various media file types, and/or to provide special effects and graphical elements. For a digital audio workstation, plug-ins can provide a range of additional functionality, such as emulation of various musical instruments, or applying effects such as reverb. FIG. 1 illustrates the traditional deployment of plug-ins as software modules interfacing directly with media processing desktop client application 102. The client application may be a media processing application, such as a media authoring application for time-based media. These include non-linear video editing applications, such as Media Composer®, a product of Avid® Technology, Inc. of Burlington, Mass., and digital audio workstations, such as Pro Tools®, also a product of Avid Technology, Inc. Plug-in software module descriptions 104, 106, 108, and 110 interface with standard API hosts such as Avid Media Access (AMA) 112, 114, Advanced Vector Extensions 2 (AVX2) 116, and Avid Audio Extensions (AAX) 118. Each API host uses the plug-in description to generate a plug-in instance running on the same platform that hosts the client application, shown in the figure as plug-in reader instance 120, plug-in video effect instance 122, plug-in audio effect instance 124, and plug-in writer instance 126. When the client application needs to import a file, plug-in reader instance 120 reads file 128 from storage, and outputs it to audio buffer 130 and video buffer 132, which are presented to generic reader 134 running in application media player 136. Operator 1 138 and operator 2 140 represent portions of client application 102 that receive input from or provide output to a plug-in instance under the control of the client application. The figure shows an example in which the client application needs to apply a video effect and an audio effect to the imported media file. To accomplish this, the application invokes operator 1 138 to receive the imported video from file 128 file via generic reader 134, which provides the video data to operator 1 138 via video buffer 142. Operator 1 routes the video via video buffer in 144 to plug-in video effect instance 122, which performs the processing that implements the video effect on the video data. Once the video effect has been applied to the video data, the processed video data is sent via video buffer out 146 back to operator 1 138, where it is routed via video buffer 148 to generic writer 150 for output as a file. In an analogous fashion, the audio from file 128 is sent by generic reader 134 via audio buffer 152 to operator 2 140, which routes the audio data via audio buffer in 154 to plug-in audio effect instance 124 for audio effect processing. The processed audio is returned via audio buffer out 156 to operator 2 140, which sends it via audio buffer 158 to generic writer 150 for output as a file. Generic writer 150 receives the processed video and audio from buffers 148 and 158 respectively and directs it via buffers 160 and 162 to plug-in writer instance 126, which writes the processed audio and video to file 164.

The architecture illustrated in FIG. 1, in which plug-in instances are created within the host running the client application is not compatible with modern Cloud-based service-oriented frameworks. In the FIG. 1 architecture, each of the software modules, such as the reader, writer, and effect-processing elements need to work together within a single execution node, such as a single server or workstation. Scaling up requires the addition of more physical workstations and server nodes. Furthermore, the separate nodes are coupled, with the rate of overall throughput being determined by the slowest-executing process.

We describe a service-oriented architecture for plug-ins, in which each plug-in is treated as a microservice that runs in a server environment under a service-hosting framework. The plug-in operates in a decoupled fashion without knowledge of other plug-ins. However, in order to be able to use a plug-in description in its original form, i.e., in the form designed to execute within the same client system that executes the media processing application, as illustrated in FIG. 1, a gasket is required for each of the plug-ins implemented as a microservice. The gasket calls a plug-in host, which reads the plug-in description and creates an instance of the plug-in encapsulated within the gasket. The plug-in host type matches the type of plug-in that is to be deployed. Any type of plug-in may be used, including but not limited to AMA and AAX plug-ins. For example, an AMA host is used to read an AMA plug-in description and create an AMA plug-in instance running within the gasket. The gasket, plug-in host, and plug-in instance run on a hosting system within the service hosting framework, while the plug-in description may be located on another system accessed over the network, e.g., by using a network URL. A gasket appears to the service-oriented framework as a regular microservice, acting as a proxy for the processing elements within it. In the described service-oriented architecture for plug-ins, the plug-ins may be used in unmodified form, i.e., as copies of existing plug-ins that run in the traditional way, as described above and illustrated in FIG. 1.

When a plug-in is added to the environment, its gasket registers and sets up the plug-in within the overall system, which includes forming a connection with a messaging system and publishing its API. In various embodiments, the messaging system is implemented as a message bus or as a service mesh. The messages may comprise direct calls to the APIs of the plug-in modules. The gasket exposes the API for its microservice, with each microservice providing an atomic function whose operation is decoupled from that of other microservices on the message bus. This contrasts with the multiple functions of a typical monolithic service running in a client server environment. Each of the APIs are specific in their requirements as to the form their data inputs and outputs take. The gaskets receive incoming data and present it to the plug-in the form the plug-in requires and convert outgoing data into a required media transmission modality. For example, if the plug-in inputs and outputs buffers, it is the gasket's responsibility to convert any other incoming media transmission modality to buffers for presenting to the plug-in, and to convert data output by the plug-in to a buffer into the media transmission modality. The modalities discussed herein include media files, intermediate files, and network streams.

AMA-based plug-in readers typically input a file and output a buffer; AVX2 and AAX plug-in effects typically input and output video and audio buffers respectively. AMA-based writers typically input buffers and output a file. Gaskets convert the files and buffers required by the plug-in instances into files written to storage or into the streams utilized in a distributed Web-based microservices architecture. Thus, for an AMA reader, a plug-in instance expects a file and so its gasket presents an incoming file to the plug-in instance without any conversion. For output, the AMA reader is expected to produce a buffer. Since the buffers are expected to be transferred to other microservices, the gasket writes the buffers out as an intermediate file on shared storage. The shared storage may be local or implemented as replicated or distributed storage. When the file has been written to shared storage, the gasket outputs a message that it has generated an intermediate file, together with its location on shared storage. The next microservice that is to operate on the media receives the message, and in response, retrieves the intermediate file. For AVX2 and AAX plug-ins, their respective gaskets convert the incoming intermediate file into buffers and transfer their output buffers as an intermediate file. When effects processing is complete, a message is directed to an AMA writer microservice. An AMA writer instance expects a buffer as input, and a file handle as output, so the gasket converts an intermediate file to a buffer and hands it to the plug-in writer instance, which outputs a file, which the gasket passes on without conversion for writing to shared storage. It then outputs a message indicating that the output file has been written together with its location on shared storage.

Gaskets also get and set parameters required for a plug-in's execution logic as bus-based API calls and provide persistence of plug-in parameters. Such parameters determine aspects of the processing function performed the plug-in. For example, when the plug-in performs a blur effect on video or graphics, the gasket may receive parameters for the degree of blur and the x, y, components of a motion blur. Or when performing an audio equalization, the received parameters may be the equalization values for each frequency band. In addition, gaskets send notifications, queries, and commands over the message bus, including messages indicating the completion of a job. The messaging may be implemented outside of a bus-based mechanism through any other message transport mechanism, such as direct network calls between services, or a service mesh. Gaskets also convert notifications provided by the plug-in instance and transmit them over the message bus, publishing and subscribing to specified channels or events.

Each gasket is set up with control logic that specifies what messages it is to subscribe to, and how results of plug-in instance processing are to be output. The control logic is determined by the client application via message instructions received from the client. In implementations that include a data bus (described below), the messages specify the data channels it needs to subscribe to as well as the message types.

Figure 2A:
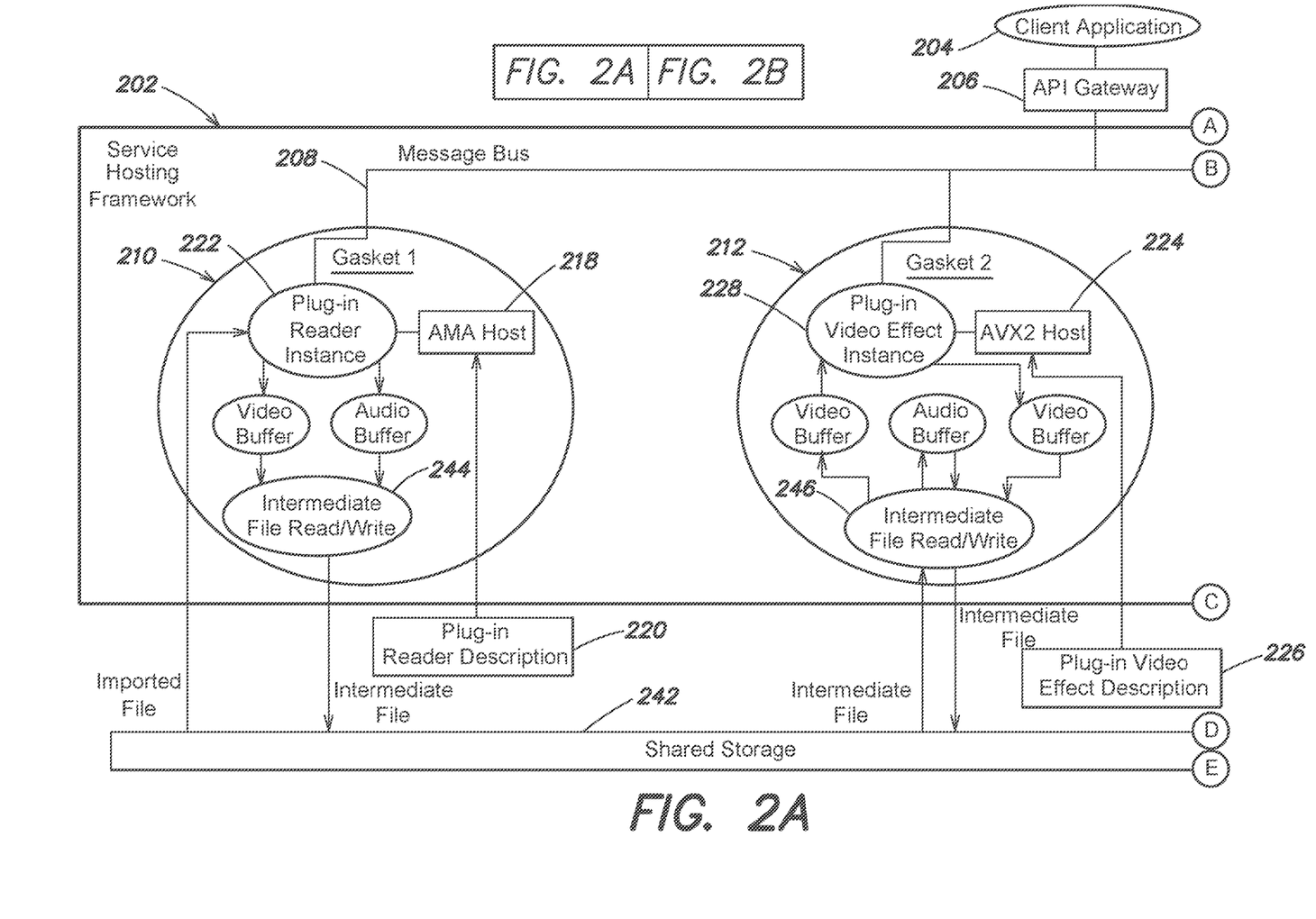
FIGS. 2A and 2B illustrate an architecture for deploying third party plug-ins as microservices within a distributed service-oriented environment.
Figure 2B:
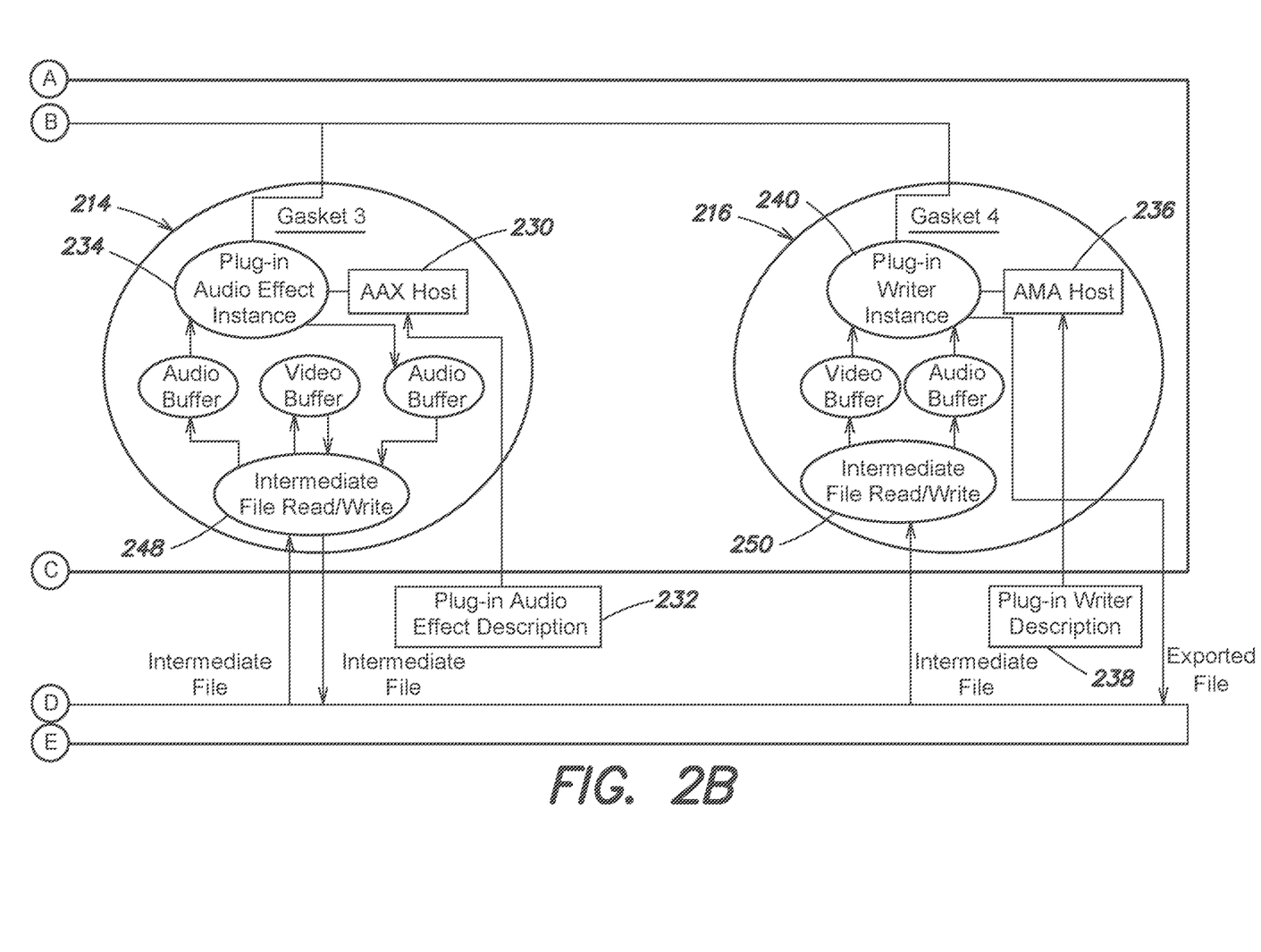

FIGS. 2A and 2B illustrate the redeployment of third party plug-ins as microservices within service hosting framework 202 in a distributed networked environment. Data communication over a network is indicated in the figure by dotted lines and data travelling within a particular host is shown as solid lines. Client application 204 (e.g., a media processing application such as a non-linear video editor or a digital audio workstation) communicates with the plug-in microservices via API gateway 206 to message bus 208. Gaskets 1 210, gasket 2 212, gasket 3 214, and gasket 4 216 send messages over the message bus, and receive messages over the bus from the client application and from other microservices. The messages include those involved in registering and setting up a new plug-in service, as well as notifications, queries and commands. Unmodified third-party software plug-in modules are read by API hosts running within their gaskets. The hosts create instances of the plug-ins running within the gasket; these instances implement the function of the plug-in. The figure shows AMA host 218 reading plug-in reader description 220 and using it to generate plug-in reader instance 222 within gasket 1 210. Similarly, AVX2 host 224 reads plug-in video effect 226 to generate plug-in video effect instance 228 within gasket 212; AAX host 230 reads plug-in audio effect description 232 to generate plug-in audio effect instance 234 within gasket 3 214; and AMA host 236 reads plug-in writer description 238 to generate plug-in writer instance 240 running within gasket 4 216.

In response to a message from client application 204 to initiate processing on a media file, plug-in reader instance 222 imports a media file from shared storage 242. The media file includes one or more of video, audio, and graphics. The data within the file representing the content that is perceivable to a user as video, audio, or graphics, is referred to as media essence. A portion of a media file that contains time-based media essence, i.e., video and audio, may also include ancillary data. For example, the ancillary data portion of a digital video broadcast stored in the file may include closed captions or subtitles, timecode, GPS data, or text or graphic station identifiers. The plug-in reader instance outputs the imported file via a video buffer and audio buffer to intermediate file read/write module 244 implemented within gasket 1 210, which sends the file to shared storage 242. Gasket 1 210 then issues a message that the intermediate file has been written together with its storage location. The message is received by gasket 2 212, which causes plug-in video effect instance 228 to receive the intermediate file via intermediate file read/write module 246 and via a video buffer, implement a video effect on video essence received from the intermediate file, and output the processed media essence via a video buffer to intermediate file read/write module 246, which writes the intermediate file containing the processed video essence to shared storage 242. Audio from the incoming intermediate file is retained in an audio buffer, and after completion of the video effect processing is recombined with the processed video by intermediate file read/write module 246. Gasket 2 212 then issues a message that the intermediate file has been written. Gasket 3 214 receives the message and routes the intermediate file to plug-in audio effect instance 234 via intermediate read/write module 248 and via an audio buffer. The plug-in audio effect instance implements an audio effect on the audio essence received from the input intermedia file, and outputs the processed media via an audio buffer and intermediate file read/write module 248 to shared storage 242. Video from the incoming intermediate file is retained in a video buffer, and after completion of the audio effect processing is recombined with the processed audio by intermediate file read/write module 248. Gasket 3 214 then issues a message that the intermediate file has been written. Gasket 4 216 receives the messages that the video effect and the audio effect have been applied and causes plug-in writer instance 240 to receive the intermediate file via intermediate file read/write module 250 and via video and audio buffers, and to export the media data as a file to shared storage 242.

Various methods may be used to sequence the execution of the multiple microservices. In one method, the client application sends a message to a specific one of the services to cause it to initiate processing. In another method, the client application initiates the first service, e.g., the plug-in reader, which is the trigger for the entire sequence of microservice actions. This may be implemented via a watch folder that checks for an appropriate message from the client application initiating the process, or from another microservice indicating completion of processing by that microservice.

The sequencing may result from messages indicating that a microservice of a particular function type has been executed, rather than from a specific microservice object. The state transition logic is embedded within each microservice. For example, if a particular microservice is to implement a first video effect after a file has been read, it waits for a message from the file reader microservice specifying that a file has been read. When it receives the message, the first video effect microservice, such as a blur effect, starts executing; a second video effect, such as a color correction, that is required to follow the first video effect waits to receive a message from the first video effect microservice that it has completed processing and written out an intermediate file before it starts executing. The transition state logic for the file writer microservice may require receipt of completion messages from each of the registered video effects and audio effects before triggering writing out of the processed media to shared storage.

In order to reduce latency and facilitate rapid media essence exchange between microservices, a streaming data bus may be introduced. Between the initial input of a file or a network stream and the final output of a file or a network stream, the media essence is shared via a streaming data bus. This implementation allows for microservices-based processing to be applied in a live environment since the processing is now able to match the incoming sample rate because of the elimination of delays associated with writing intermediate files to disk, and because multiple processes implementing the plug-ins run in parallel in a distributed environment.

Just as in the implementation without a data bus illustrated in FIGS. 2A and 2B, the client application in the implementation with the data bus communicates with the plug-in microservices via an API gateway to a message bus, which interacts with the standard plug-in APIs via the gaskets. Similarly, the third-party software plug-in modules run on servers in the Web-based environment, being read by API hosts running within a gasket, which encapsulates a plug-in instance. However, when a data bus is present, the various input and output buffers are not transferred as intermediate files to shared storage. Instead, output buffers are streamed to the data bus and incoming streams received from the data bus populate the input buffers. The data bus introduces a decoupling of the media essence stream from the plug-in processing sequence, in a fashion that is analogous to the way the message bus facilitates decoupling of the control. The decoupling is achieved by using multiple essence channels on the data bus, enabling each microservice to subscribe to a different set of one or more essence channels on the data bus. The gasket provides an identity of the essence stream channel for a plug-in microservice at the time it registers the service with the service framework. When a new service is registered, the gasket also declares which essence streams it subscribes to. The service framework is responsible for performing the appropriate routing so that each service receives the media essence channel(s) to which it is subscribed. When a microservice publishes media essence to a channel on the data bus, it identifies the published channel with the gasket-assigned identity for the microservice that is publishing it. Other service(s) that wish to receive the channel from this service subscribe to this channel. The service framework keeps the channels separate over the network and on the data bus and manages the routing of the signals corresponding to each channel to the services that subscribe to that channel. The process is analogous to that performed by the message bus framework for the routing of messages, but unlike messages, streams have a large payload and take longer to transfer. Another difference between the handling of messages and streams concerns clocking: messages are not clocked, but a data bus may be clocked (synchronous) or unclocked (asynchronous).

Using the example mentioned above, an editor may wish to perform two video effects with two different plug-ins: a blur effect and a color correction. The plug-ins for performing a blur and for performing color correction are registered as microservices. Following receipt of an appropriate message, the blur microservice reads an appropriate video channel, performs the blur, and outputs a video stream to a "blurred" channel. The color correction microservice is subscribed to the blurred channel, and when it receives a message that an output stream from the blur microservice is available, the blur is completed, reads in the blurred channel stream, applies the color correction, and streams out the results to a "color corrected" channel. If the blurred, color-corrected video represents the end of the current phase of processing, the writer microservice, in response to messages that a channel stream with media that has been processed both by the blur plug-in and by the color-correction plug-in is available, reads in the media stream from the color corrected channel to which it is subscribed, and outputs the media as an exported file to the shared storage.

Figure 3A:
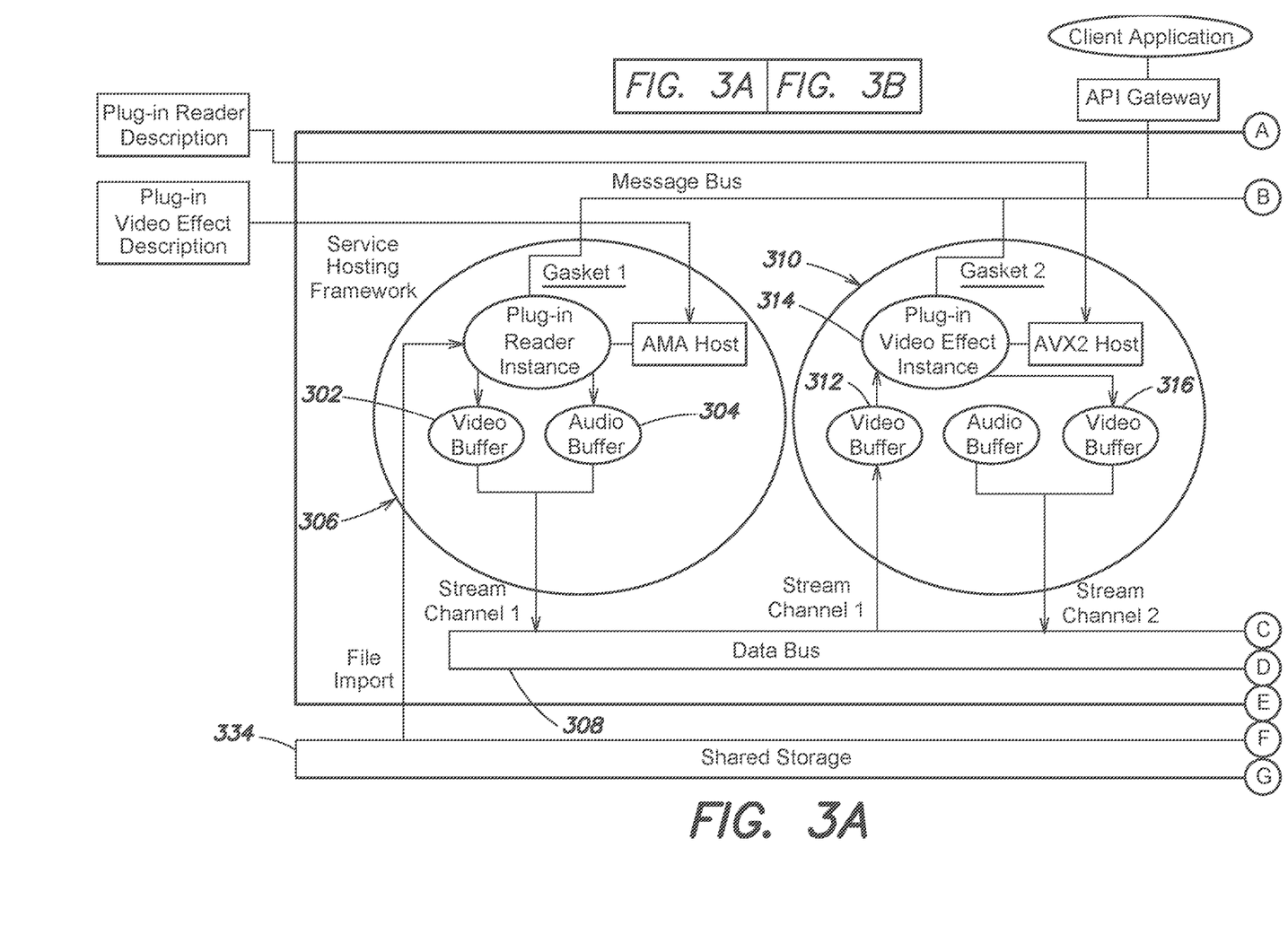
FIGS. 3A and 3B illustrate the architecture of FIGS. 2A and 2B, with the addition of a data bus for sharing media between plug-in hosts.
Figure 3B:
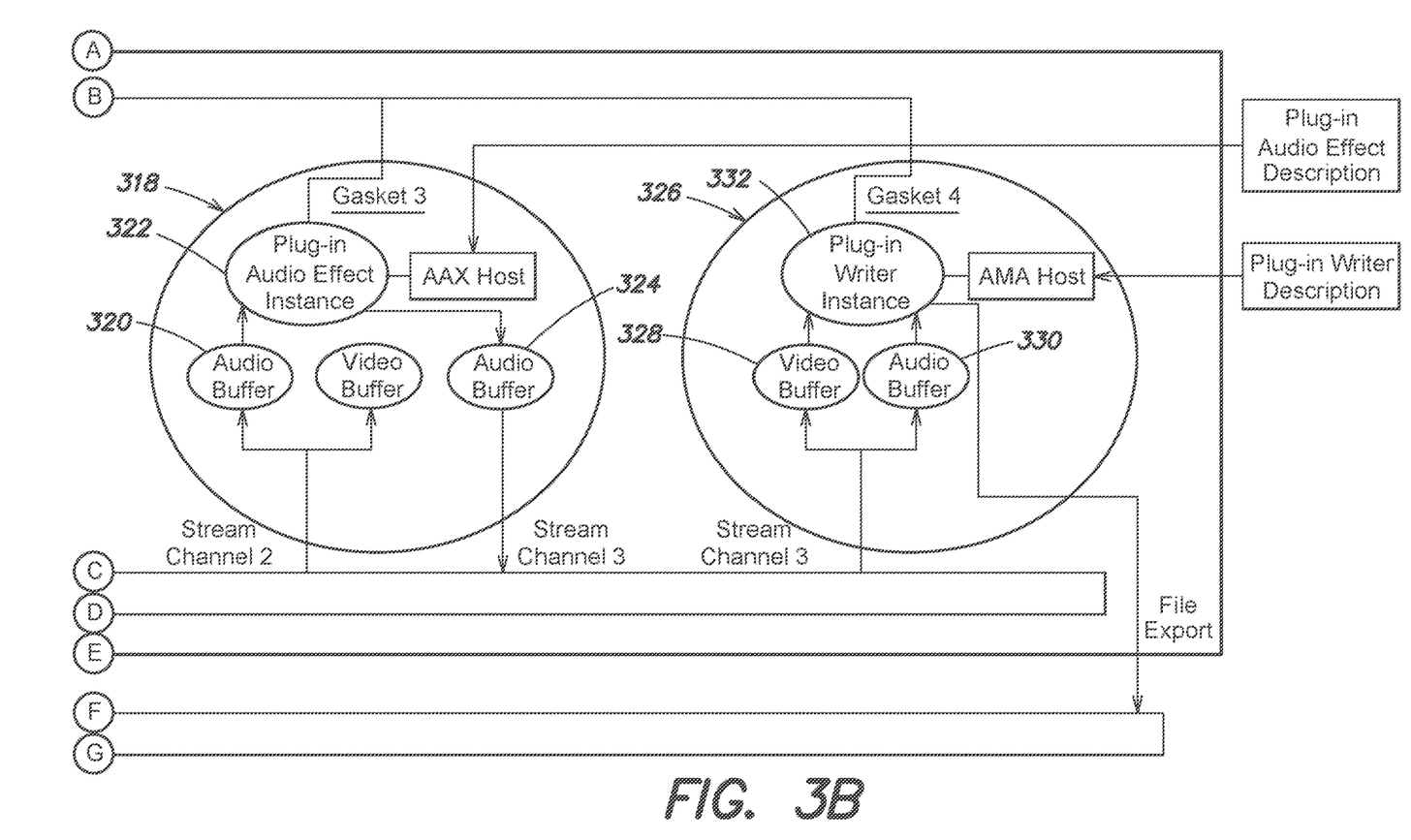

An implementation of plug-ins deployed as microservices in a framework that includes a data bus in addition to shared storage is illustrated in FIGS. 3A and 3B. As with the implementation described above, the client application may be media processing/authoring application, such as a non-linear video editor or a digital audio workstation. Plug-in reader instance output video buffer 302 and output audio buffer 304 are emptied and streamed by gasket 1 306 as stream channel 1 on data bus 308, where the identity of channel 1 is associated with the plug-in reader service. Unlike the implementation of FIGS. 2A and 2B, no intermediate files are created. Gaskets corresponding to the microservices that subscribe to the channel associated with plug-in reader receive the media essence from the data bus as incoming streams, collecting samples to fill buffers that are input to the subscribing plug-in instances. Referring to FIGS. 3A and 3B, gasket 2 310 subscribes to the output stream from the plug-in reader service, i.e., channel 1 in the figure, collects samples and fills video buffer 312 which is input by plug-in video effect instance 314. The plug-in instance processes the media essence, applying the video effect, and outputting the result to video buffer 316, which is emptied and streamed by gasket 2 310 to data bus 308 with a channel designation, i.e., channel 2 in the figure, corresponding to the microservice provided by plug-in video effect instance 314. In the example of a blur effect mentioned above, stream channel 2 would be the "blurred" channel.

Similarly, gasket 3 318 of the AAX plug-in audio effect microservice subscribes to stream channel 2 associated with the plug-in video effect, collects samples and fills audio buffer 320, and presents the essence to plug-in audio effect instance 322. The audio effect is applied, the processed media essence is output to audio buffer 324, which is streamed by gasket 3 318 to data bus 308 as a stream channel bearing the microservice identity assigned by gasket 3 318, i.e., channel 3 in the figure. For example, if the AAX audio effect is a reverb effect, stream channel 3 would be a "reverb applied" channel. The one or more channels to which plug-in reader microservice is subscribed are received by gasket 4 326, which populates video buffer 328 and audio buffer 330 that in turn present the video and audio media essence to plug-in writer instance 332, which exports the data as a file to shared storage 334. The figure illustrates plug-in writer gasket 4 326 subscribing to stream channel 3, i.e., to the media essence stream that results from processing by both the AVX2 video effect and by the AAX audio effect.

Although the descriptions above refer only to single input and output video and audio buffers, various implementations have multiple input and output buffers to optimize throughput. Multiple For output buffers, one buffer may be streamed out while another is written to by the plug-in instance; for input buffers, one buffer may be receiving samples from an incoming stream, while another is presenting essence samples to a plug-in instance.

The plug-in microservices may perform media processing that involves multiple incoming media files. For example, to achieve a video or audio compositing effect, multiple media essence files are imported and then read into the plug-in effect instance as intermediate files from shared storage or as streams from a data bus, using the processes described above. To implement such multi-input services, multiple input buffers are used.

The various components of the systems described herein may be implemented as computer programs using general-purpose computer systems. Such computer systems typically include a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to each computer system. Example output devices include, but are not limited to, liquid crystal displays (LCD), plasma displays, various stereoscopic displays including displays requiring viewer glasses and glasses-free displays, cathode ray tubes, video projection systems and other video output devices, printers, devices for communicating over a low or high bandwidth network, including network interface devices, cable modems, and storage devices such as disk or tape. One or more input devices may be connected to the computer system. Example input devices include, but are not limited to, a keyboard, keypad, track ball, mouse, pen and tablet, touchscreen, camera, communication device, and data input devices. The invention is not limited to the particular input or output devices used in combination with the computer system or to those described herein.

Each computer system may be a general-purpose computer system, which is programmable using a computer programming language, a scripting language or even assembly language. The computer system may also be specially programmed, special purpose hardware. In a general-purpose computer system, the processor is typically a commercially available processor. Each general-purpose computer also typically has an operating system, which controls the execution of other computer programs and provides scheduling, debugging, input/output control, accounting, compilation, storage assignment, data management and memory management, and communication control and related services. Each computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, control messages, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid-state drives, which may include an array of local or network attached disks.

Systems such as those described herein may be implemented in software, hardware, firmware, or a combination of the three. The various elements of each system, either individually or in combination may be implemented as one or more computer program products in which computer program instructions are stored on a computer readable medium for execution by a computer or transferred to a computer system via a connected local area or wide area network. Various steps of a process may be performed by a computer executing such computer program instructions. The computer system may be a multiprocessor computer system or may include multiple computers connected over a computer network. The computer system and the computer program products they run may be deployed in the Cloud. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of using a first plug-in software module with a media processing application to process a media file in a distributed service hosting environment, the method comprising:
   in response to receiving a first message:
      using a first plug-in host running within a first gasket within a service hosting framework to read a description of the first plug-in software module and to generate an instance of the first plug-in software module running within the first gasket;

wherein the first plug-in software module is a copy of an original version of the first software plug-in module designed to be hosted within the media processing application;
inputting media essence obtained directly or indirectly from the media file to the instance of the first plug-in software module via the first gasket, wherein the first gasket presents data to the first plug-in instance in a format determined by input requirements for the first plug-in instance;
processing the media essence with the instance of the first plug-in software module;
outputting the processed media essence from the instance of the first plug-in software module; and
using the first gasket to:
convert the processed media essence output into a stream for streaming as a media essence channel on a data bus;
associate a first channel identity with the media essence channel; and
issue a second message indicating that processed media essence is available as a media essence channel stream on the data bus.

2. The method of claim 1, wherein the first message is received, and the second message is issued over a messaging system.

3. The method of claim 1, wherein the media essence from the media file includes video and processing of the media essence with the instance of the first plug-in software module comprises applying a first video effect to the media essence.

4. The method of claim 1, wherein the media essence from the media file includes audio and processing of the media essence with the instance of the first plug-in software module comprises applying a first audio effect to the media essence.

5. The method of claim 1, wherein the media essence from the media file includes graphics and processing of the media essence with the instance of the first plug-in software module comprises applying a first graphics effect to the media essence.

6. The method of claim 1, wherein the media essence from the media file includes ancillary data, and processing of the media essence with the instance of the first plug-in software module comprises processing the ancillary data.

7. The method of claim 1, wherein the received message was sent by the media processing application.

8. The method of claim 1, wherein the received message was sent by a second gasket within the service hosting framework when an instance of a second plug-in running within the second gasket outputted media essence processed by the instance of the second plug-in.

9. The method of claim 8, wherein processing of the media essence with the instance of the first plug-in comprises applying a first effect to the media essence output by the instance of the second plug-in and processing of the media essence with the instance of the second plug-in comprises applying a second effect to media essence input to the instance of the second plug-in.

10. The method of claim 9, wherein applying a first effect to the media essence output by the instance of the second plug-in comprises performing video color-correction to the media essence output by the instance of the second plug-in.

11. The method of claim 9, wherein applying the second effect to media essence input to the instance of the second plug-in comprises applying a video blur effect to the media essence input to the instance of the second plug-in.

12. The method of claim 1, wherein the format required by the input requirements for the first plug-in instance comprises one of a file and a buffer.

13. The method of claim 1, wherein the first plug-in software module is a media file reader.

14. The method of claim 1, further comprising inputting media essence obtained from a second media file to the instance of the first plug-in software module via the first gasket, wherein processing the media essence with the instance of the first plug-in module includes processing media essence obtained from the second media file.

15. The method of claim 14, wherein the instance of the first plug-in module applies a video compositing effect.

16. The method of claim 1, wherein the instance of the first plug-in module receives a parameter value via the first gasket and an aspect of the processing of the media essence with the instance of the first plug-in is controlled by the parameter value.

17. A computer program product comprising:
a non-transitory computer-readable medium with computer program instructions encoded thereon, wherein the computer program instructions, when processed by a computer system instruct the computer system to perform a method of using a first plug-in software module with a media processing application to process a media file in a distributed service hosting environment, wherein the first plug-in software module is a copy of an original version of the first software plug-in module designed to be hosted within the media processing application, the method comprising:
in response to receiving a first message:
using a first plug-in host running within a first gasket within a service hosting framework to read a description of the first plug-in software module and to generate an instance of the first plug-in software module running within the first gasket;
inputting media essence obtained directly or indirectly from the media file to the instance of the first plug-in software module via the first gasket, wherein the first gasket presents data to the first plug-in instance in a format determined by input requirements for the first plug-in instance;
processing the media essence with the instance of the first plug-in software module;
outputting the processed media essence from the instance of the first plug-in software module; and
using the first gasket to:
convert the processed media essence output into a stream for streaming as a media essence channel on a data bus;
associate a first channel identity with the media essence channel; and
issue a second message indicating that processed media essence is available as a media essence channel stream on the data bus.

18. A method of using a first plug-in software module with a media processing application to process a media file in a distributed service hosting environment, the method comprising:
in response to receiving a first message:
using a plug-in host running within a gasket within a service hosting framework to read a description of the plug-in software module and to generate an instance of the first plug-in software module running within the gasket;

wherein the first plug-in software module is a copy of an original version of the first software plug-in module designed to be hosted within the media processing application;

inputting media essence obtained directly or indirectly from the media file to the instance of the plug-in software module via the gasket, wherein the gasket presents data to the t plug-in instance in a format determined by input requirements for the plug-in instance;

processing the media essence with the instance of the plug-in software module;

outputting the processed media essence from the instance of the plug-in software module; and using the gasket to:
output the processed media essence from the instance of the plug-in software module as a processed media file that is written onto shared storage; and issue a second message indicating that processed media essence file has been written to shared storage.

19. A method of using a plug-in software module with a media processing application to process a media file in a distributed service hosting environment, the method comprising:

in response to receiving a first message:
using a plug-in host running within a gasket within a service hosting framework to read a description of the plug-in software module and to generate an instance of the plug-in software module running within the gasket;

wherein the first plug-in software module is a copy of an original version of the first software plug-in module designed to be hosted within the media processing application;

via the gasket, inputting to the instance of the plug-in software module media essence obtained from a channel on a data bus, wherein the channel is associated with a channel identity and wherein the gasket presents data to the plug-in instance in a format determined by input requirements for the plug-in instance;

processing the media essence with the instance of the plug-in software module;

outputting the processed media essence from the instance of the plug-in software module; and using the gasket to:
convert the processed media essence output into a stream for streaming as a media essence channel on a data bus; and issue a second message indicating that processed media essence is available as a media essence channel stream on the data bus.

20. A method of using a plug-in software module with a media processing application to process a media file in a distributed service hosting environment, the method comprising:

in response to receiving a first message:
using a plug-in host running within a gasket within a service hosting framework to read a description of the plug-in software module and to generate an instance of the plug-in software module running within the gasket;

wherein the first plug-in software module is a copy of an original version of the first software plug-in module designed to be hosted within the media processing application;

via the gasket, inputting to the instance of the plug-in software module media essence obtained from a channel on a data bus, wherein the channel is associated with a channel identity and wherein the gasket presents data to the plug-in instance in a format determined by input requirements for the plug-in instance;

processing the media essence with the instance of the plug-in software module;

outputting the processed media essence from the instance of the plug-in software module; and using the gasket to:
output the processed media essence from the instance of the plug-in software module as a processed media file that is written onto shared storage; and issue a second message indicating that processed media essence file has been written to shared storage.

* * * * *